United States Patent
Sundet et al.

(10) Patent No.: US 12,331,666 B2
(45) Date of Patent: Jun. 17, 2025

(54) RATIOMETRIC SYSTEM FOR AUTONOMOUS LUBRICATION OF PRODUCTION EQUIPMENT

(71) Applicant: Double EE Service & Supply Co., Williston, ND (US)

(72) Inventors: Warren Daniel Sundet, Williston, ND (US); Kyle Collins Knox, Williston, ND (US); Taylor Linn Oxendahl, Williston, ND (US)

(73) Assignee: Double EE Service & Supply Co., Williston, ND (US)

( * ) Notice: Subject to any disclaimer, the term of this patent is extended or adjusted under 35 U.S.C. 154(b) by 0 days.

(21) Appl. No.: 18/394,586

(22) Filed: Dec. 22, 2023

(65) Prior Publication Data
US 2024/0218815 A1 Jul. 4, 2024

Related U.S. Application Data

(60) Provisional application No. 63/437,099, filed on Jan. 4, 2023.

(51) Int. Cl.
| | |
|---|---|
| *G05B 19/04* | (2006.01) |
| *E21B 33/08* | (2006.01) |
| *E21B 43/12* | (2006.01) |
| *F01M 1/02* | (2006.01) |
| *F01M 1/14* | (2006.01) |

(Continued)

(52) U.S. Cl.
CPC ............. *F01M 1/14* (2013.01); *E21B 33/08* (2013.01); *E21B 43/127* (2013.01); *F01M 1/02* (2013.01); *F16N 7/38* (2013.01); *F16N 29/02* (2013.01); *G05B 19/0415* (2013.01); *F16N 2230/10* (2013.01); *G05B 2219/2618* (2013.01)

(58) Field of Classification Search
None
See application file for complete search history.

(56) References Cited

U.S. PATENT DOCUMENTS

| | | |
|---|---|---|
| 3,707,203 A | 12/1972 | Roberts |
| 4,445,168 A | 4/1984 | Petryszyn |

(Continued)

FOREIGN PATENT DOCUMENTS

| | | |
|---|---|---|
| CN | 203857252 U | 10/2014 |
| CN | 105135194 B | 2/2018 |

(Continued)

*Primary Examiner* — Kamini S Shah
*Assistant Examiner* — Istiaque Ahmed
(74) *Attorney, Agent, or Firm* — Kilpatrick Townsend & Stockton LLP

(57) ABSTRACT

A ratiometric system for autonomous lubrication of oilwell production equipment. In one arrangement a lubrication pump is fluidly connected to a stuffing box on an oilwell pumping unit. The interval for lubrication and the duration of lubrication is managed by an event sequencer that is electrically connected to the well controller for the pumping unit. The well controller senses a completed cycle of the pumping unit and produces an electronic pulse that can be counted. The event sequencer counts the pulses as they occur. A lubrication cycle is triggered when the sequencer reaches a count corresponding to a predetermined value. The amount of lubrication supplied is directly related to the number of completed cycles of the pumping unit.

19 Claims, 9 Drawing Sheets

(51) Int. Cl.
*F16N 7/38* (2006.01)
*F16N 29/02* (2006.01)

(56) References Cited

U.S. PATENT DOCUMENTS

| | | | |
|---|---|---|---|
| 4,757,878 A | 7/1988 | Iino et al. | |
| 5,060,760 A | 10/1991 | Long et al. | |
| 5,381,874 A | 1/1995 | Hadank et al. | |
| 5,482,138 A | 1/1996 | Mori et al. | |
| 5,823,295 A | 10/1998 | Griffith et al. | |
| 5,865,245 A * | 2/1999 | Trout | E21B 33/08 166/84.2 |
| 6,557,651 B1 | 5/2003 | Norby et al. | |
| 8,844,680 B2 | 9/2014 | Algiiera et al. | |
| 9,605,506 B1 * | 3/2017 | Jameson | F16N 19/006 |
| 9,920,878 B2 | 3/2018 | Beck | |
| 10,144,653 B2 | 12/2018 | Black et al. | |
| 10,472,255 B2 | 11/2019 | Black et al. | |
| 10,884,437 B1 | 1/2021 | Black et al. | |
| 10,895,205 B1 | 1/2021 | Black et al. | |
| 10,920,769 B2 | 2/2021 | Rosca et al. | |
| 11,624,278 B2 | 4/2023 | Williams et al. | |
| 2012/0171049 A1 | 7/2012 | Paluncic et al. | |
| 2016/0084242 A1 * | 3/2016 | Prineppi | F04B 13/00 417/44.1 |
| 2022/0316307 A1 * | 10/2022 | Curry | E21B 43/2607 |
| 2022/0325711 A1 * | 10/2022 | Dolan | F04B 23/025 |
| 2023/0341086 A1 * | 10/2023 | Sunderland | F16N 29/02 |

FOREIGN PATENT DOCUMENTS

| | | |
|---|---|---|
| CN | 106678525 B | 4/2020 |
| CN | 210510995 U | 5/2020 |
| CN | 111336396 B | 8/2020 |
| CN | 112160905 A | 1/2021 |
| CN | 113833967 B | 3/2022 |
| CN | 114623367 A | 6/2022 |
| CN | 217178233 U | 8/2022 |

* cited by examiner

RATIOMETRIC SYSTEM FOR AUTONOMOUS LUBRICATION OF PRODUCTION EQUIPMENT

CROSS REFERENCE TO RELATED APPLICATION

The present application claims priority to U.S. Provisional Patent Application No. 63/437,099, filed Jan. 4, 2023, the disclosure of which is incorporated herein by reference in its entirety.

FIELD OF INVENTION

This disclosure relates generally to the field of lubrication for use with hydrocarbon producing wells and other equipment.

BACKGROUND

Actively producing hydrocarbon wells incorporate pipe, pumps and other associated equipment to transfer fluid from the bottom of the well to the surface. A common pump configuration involves a mechanical pump at the bottom of the well. The pump is mechanically connected to a pumping unit on the surface by a string of solid metal rods. The string of rods is contained within a pipe, the tubing, that extends from the pump to the surface. The uppermost rod in the string, the polished rod, connects the rod string to the pumping unit. The pumping unit moves the rods up and down, thereby operating the pump at the bottom of the well. Repeated cycles of this movement cause fluid at the bottom of the well to be pumped, in the tubing, to the surface. At the surface the fluid flows to equipment that separates the fluid into oil, gas, and water. In order to prevent leaks at the top of the tubing as the polished rod moves up and down, a device, a stuffing box, is used to provide a seal around the polished rod.

In order to maintain the necessary seal around the polished rod, oil, grease, or other substances may be used as a lubricant inside the stuffing box. The application of lubricant is extremely important to the continued operation of a producing well. The oil industry has not demonstrated the ability to provide an effective solution for autonomous lubrication based on the number of completed pumping cycles of the pumping unit.

BRIEF DESCRIPTION OF THE DRAWINGS

The disclosure will be readily understood by the following detailed description in conjunction with the accompanying drawings, wherein like reference numerals designate like structural elements, and in which.

SUMMARY

Figure 1A:
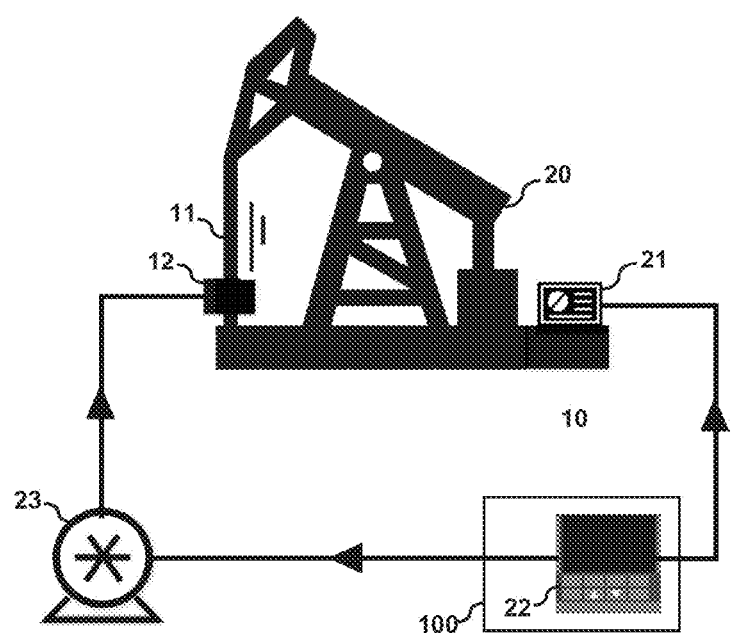
FIG. 1A illustrates automatic lubrication for an example oilwell pumping unit, according to some embodiments.

According to many embodiments, ratiometric systems for autonomous lubrication are disclosed. The ratiometric system can include a lubrication system configured to automatically control lubrication operation of a system. The lubrication system can include a lubrication pump and a lubrication controller. The lubrication controller is configurable such that it can be employed for different types of applications e.g., oilwells, automotives, pumps, valves, or other systems.

In some embodiments, a lubrication system may include a lubrication pump that is fluidly connected to a stuffing box of an oilwell pumping unit. The fluid from the lubrication pump provides lubrication for ongoing normal operation of the stuffing box. A lubrication controller comprising an event sequencer can be electrically connected to the lubrication pump. The lubrication controller controls the operation of the lubrication pump. For example, the event sequencer controls a time interval for pump operation as well as a duration of the lubrication and/or the pumping unit operation.

The operation of the oilwell pumping unit is coordinated by an on-site well controller. The well controller can be configured to sense the completion of each individual cycle of the pumping unit. The well controller can generate an electronic pulse each time a cycle is completed. The lubrication controller may be electrically connected to the well controller to allow the event sequencer to sense the electronic pulse received from the well controller.

In many embodiments, the event sequencer can be configured to include a counting function and a timer function. The counting function can be configured to enter a target value, which can represent a specified count for a particular application (e.g., oilwell). The timer function can be configured to enter a target value, which represents an ON time of the lubrication pump for a particular application. Accordingly, the lubrication controller can be customized differently for different applications.

In many embodiments, the event sequencer can be configured to count the electronic pulses associated with the completion of each pumping cycle of the pumping unit and compare the accumulated count with the target value of the counter function. When the accumulated count is equal to the target value for the counter, the timer function is enabled, which turns ON a timer. When the timer is ON, the lubrication controller can supply power to the lubrication pump for lubricating the stuffing box. The timer remains ON until the elapsed time is equal to the target value of the timer function. When the target value is reached the timer turns OFF, the controller can de-energize power to the lubrication pump, and clear the accumulated count of the counter. The amount of lubrication supplied to the stuffing box can be directly related to the number of completed cycles of the pumping unit. Other embodiments may have more, fewer, or different components than those described above. Other aspects and advantages of the system will be apparent from the following description and the appended claims.

DETAILED DESCRIPTION

Throughout this description for the purposes of explanation, numerous specific details are set forth in order to provide a thorough understanding of the many aspects and embodiments disclosed herein. It will be apparent, however, to one skilled in the art, that the many aspects and embodiments may be practiced without some of these specific details. In other instances, known structures and devices are shown in diagram of schematic form to avoid obscuring the underlying principles of the described aspects and embodiments.

FIGS. 1A-3 illustrate a ratiometric system 10 for autonomous lubrication of a machine or a system. For example, autonomous lubrication of oilwell production equipment in accordance with many embodiments of the present disclosure. The ratiometric system 10 may offer a flexible design that enables significant growth and expansion in relation to system features and characteristics. The ratiometric system 10 may allow significant flexibility in terms of possible configuration for a particular application. This aspect of the ratiometric system 10 may enable the ratiometric system 10 to be applied and used across a broad range of industries. The design of the ratiometric system 10 may facilitate a multitude of options in relation to the configuration of an embodiment. For example, FIG. 1A can represent a common beam pump unit and FIG. 1B can represent a common long stroke pumping unit.

FIG. 1A illustrates an example ratiometric system 10 for lubricating a pumping unit of an oilwell system. The oilwell system may include a well controller 21 connected electrically to an oilwell pumping unit 20. The ratiometric system 10 can include a lubrication system including a lubrication pump 23 and a lubrication controller 100. The lubrication controller 100 can be communicably coupled to the well controller 21 and configured to control operation of the lubrication pump 23. It should be understood that the type of pumping unit depicted in FIG. 1A is shown by way of example and is not meant to imply any system limitation in relation to the type of pumping unit which can be used.

The pumping unit 20 can include a polished rod 11 and a stuffing box 12. The polished rod 11 moves relative to the stuffing box 12. The stuffing box 12 can use an elastomer seal that provides a pressure barrier around the moving polished rod 11 preventing the leaking of gases or liquids. The rubbers inside, the packing, are compressed around the polished rod 11 to help create a strong seal. The stuffing box 12 seals and maintains the pressure of fluid during the pumping operation.

In order to maintain the necessary seal around the polished rod 11, oil, grease, or other substances may be used as a lubricant inside the stuffing box 12. The application of lubricant is important to the continued operation of a producing oilwell. As discussed herein, dissipation of the lubricant inside the stuffing box 12 can be related to a number of completed cycles of the pumping unit 20. For most effective lubrication an interval and an amount of lubrication is based on a number of completed pumping cycles of the pumping unit 20.

In many embodiments, the polished rod 11 is in close contact with the elastomers of the stuffing box 12. In a normally producing oilwell, fluid (e.g., oil and water) that is being produced by the oilwell provides some amount of lubrication to the elastomers. In the absence of adequate fluid, friction between the moving polished rod 11 and the elastomers produces heat that is destructive to the elastomers and leads to elastomer failure and downtime for the well.

The usual procedure to determine if adequate lubrication is present is to have field personnel carefully touch the moving polished rod 11 (e.g., with a bare hand) to subjectively determine a temperature of the polished rod 11 and an amount of lubrication present. Based on this analysis, a manual adjustment to the lubrication system is made to provide an appropriate amount of lubrication for the current situation. This analysis is often done daily to help ensure proper lubrication. The nature of oilwell operation is such that production of fluid may increase or decrease (e.g., to undesirable levels) over the course of a 24-hour period.

According to the present disclosure, dissipation of the lubricant inside the stuffing box 12 is related to the number of completed cycles of the pumping unit 20. Additionally, a lack of fluid and the associated heat produced causes lubricant to dissipate at a faster rate. When oil is used as a lubricant it does not provide a consistent coating that readily adheres to the polished rod 11. Additional heat causes a rapid increase in friction. When the ratiometric system 10 herein provides grease to the stuffing box 12, the polished rod 11 can have a "baseline coating" that is more likely to keep friction and heat production at an acceptable level as conditions change throughout the day.

When the ratiometric system 10 is initially installed, the lubrication controller 100 can be configured or set to provide lubrication for a specified amount of time for every specified strokes (e.g., indicating completed cycles) of the pumping unit. For example, the specified amount of lubrication time can be in a range 15 s to 30 s (e.g., 15 s, 20 s, 25 s, 30 s., etc.) and the specified strokes can be in a range 50 to 150, or other ranges related to a particular application. Once the initial setup has been completed field personnel can test the temperature of the polished rod 11 as described previously. During an initial 24-hour period this testing can be performed multiple times. Each time the test is done the specified stroke count can be adjusted on the lubrication controller 100. Similarly, the lubrication time may also be adjusted. This iterative process enables lubrication to be "fine-tuned" for each well.

In many embodiments, the pumping unit of the oilwell can include a system controller (e.g., a well controller 21) configured to monitor the operation of the pumping unit 20. In the illustrated embodiment, the well controller 21 may provide an electrical pulse at its output terminal that corresponds to completion of a pumping cycle. As an example, the well controller can receive signals from a Hall-effect sensor coupled to the pumping unit. The Hall-effect sensor can include magnetic sensors mounted on a pumping unit that sense passage of magnets mounted on a pumping unit crank arm. The present disclosure is not limited to a particular sensor for detecting completion of a machine cycle and other sensors may be used. For example, proximity sensor, acceleration sensor, motion sensor, or other sensors can be located on the machine (e.g., a crank arm, a valve) to detect a signal associated with completion of a machine cycle. Based on the detected sensor signal, the processor can generate an electrical signal, which includes information related to completion of the machine cycle.

In many embodiments, the lubrication controller 100 can include one or more processors configured to receive signals from a machine controller (e.g., a well controller 21), process the signals, and generate a control signal for controlling a lubrication pump to automatically lubricate a machine at the appropriate time for the appropriate duration.

The lubrication controller 100 can be electrically coupled to the machine controller (e.g., 21) and the lubrication pump 23.

In some embodiments, the lubrication controller 100 can include an event sequencer 22 configured to perform event-based sequencing of one or more functions of the lubrication controller 100. The event sequencer 22 may also be comprised of a number of functional parts. For example, the event sequencer 22 can control sequence of the operation of the lubrication pump 23 based on the electrical pulse from the well controller 21. The event sequencer 22 can control a time interval for the lubrication pump operation as well as the duration of operation.

Figure 1B:
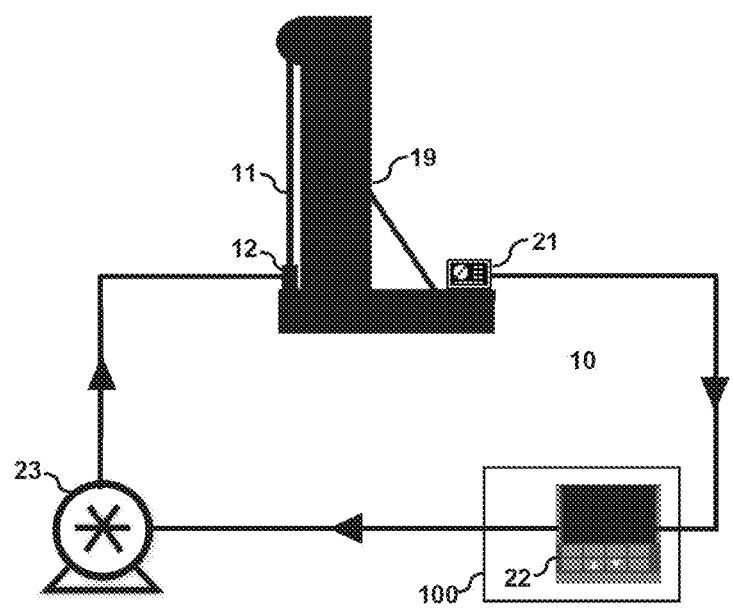
FIG. 1B illustrates automatic lubrication of another type of pumping unit, according to some embodiments.

FIG. 1A and FIG. 1B illustrate different types of pumping units that can employ a ratiometric system 10 for automatic lubrication of parts that may be employed. FIG. 1B illustrates an oilwell system employing a well controller 21 and operates in the same manner as the pumping unit shown in FIG. 1A. For example, the pumping unit 19 can be automatically lubricated by controlling the lubrication pump 23, as discussed herein.

Figure 1C:
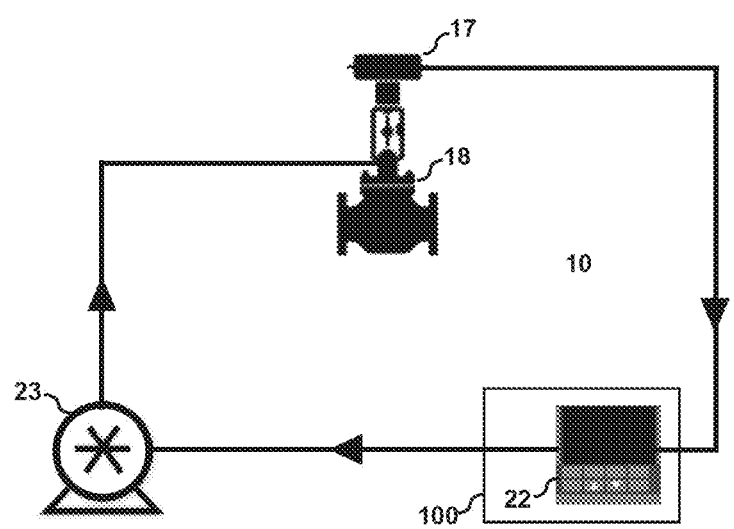
FIG. 1C illustrates automatic lubrication of a valve, according to some embodiments.

FIG. 1C illustrates a system that incorporates a valve 18 that may be actuated electrically, hydraulically or other actuation means. In the illustrated embodiment, the event sequencer 22 may be electrically connected to an electric actuator 17. The electric actuator 17 may produce an electrical signal that is present when electrically actuated valve 18 is open. A signal conditioning function (e.g., 40 in FIG. 5) may condition the electrical signal to make the signal compatible with event sequencer 22. The signal may then be counted as described herein enabling appropriate lubrication of electrically actuated valve 18.

The present disclosure is not limited to a particular application, and concepts herein can be applied to other machines involving cyclical operations. For example, the lubrication controller 100 can be communicably coupled to a machine controller to control lubrication operation of the machine based on events related to the cyclical operations of the machine.

Figure 2:
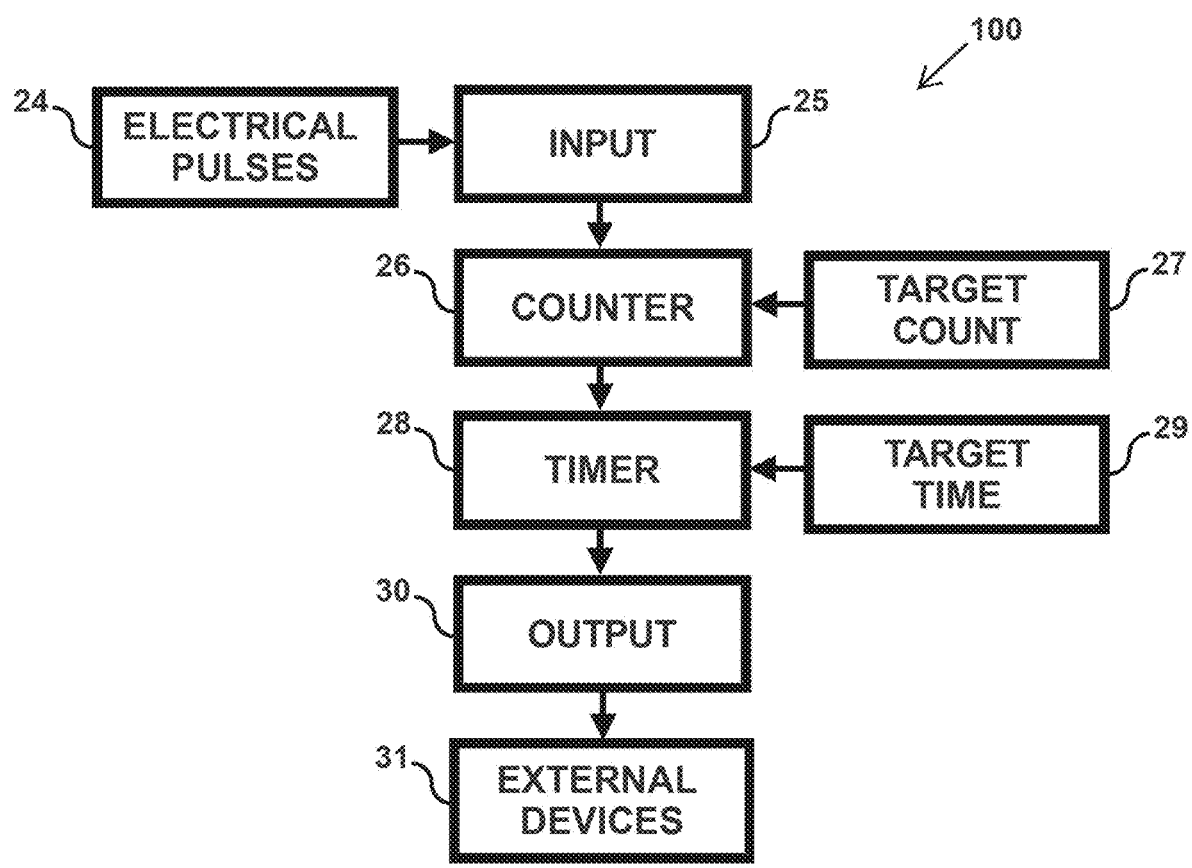
FIG. 2 illustrates the functions associated with the event sequencer for the ratiometric autonomous lubrication system.

FIG. 2 is an example block diagram of the lubrication controller 100. The lubrication controller 100 can include an input 25 and an output 30. The input 25 can be an input of the event sequencer 22 that is electrically connected to an output terminal of the well controller 21. The input 25 can receive the electrical pulses 24 from the well controller 21. The electrical pulses 24 may be counted and a total count accumulated by the event sequencer 22. The input 25 may provide an electrical interface to external devices electrically connected to the event sequencer 22.

In many embodiments, the input 25 may condition the electrical signal in a manner that enables it to be used effectively by event sequencer 22. The conditioned electrical signal from input 25 may be available to a counter function 26 in the form of an electrical pulse. The counter function 26 may provide the ability to count the electrical pulses 24 or conditioned electrical pulses provided by the input 25. The counter function 26 may allow a target count value to be entered and stored. The counter function 26 may allow the electrical pulses to be counted. A total count for a given time period may be stored by the counter function 26. The counter function 26 may allow the total count to be compared to a target count value 27. The counter function 26 may enable a timer function 28, when the total count is equal to the target count value 27, causing a timer to start.

In many embodiments, the timer function 28 may store the total elapsed time when the timer is enabled. The timer function 28 may allow a target time value 29 to be entered and stored. The timer function 28 may be disabled when the total elapsed time is equal to the target time value 29.

In many embodiments, the output 30 can be an output of the event sequencer 22. For example, the output 30 may provide an electrical interface to an external device 31 electrically connected to the event sequencer 22. When the output 30 is enabled, an electrical power source may be available to power external electrical device 31. The output 30 may be electrically connected to the lubrication pump 23. The lubrication pump 23 operates when the timer function 28 is enabled. In some embodiments, the lubrication controller 100 can be configured to allow a specified number of completed pumping cycles to be entered as the target count value 27 for the counter 26. In some embodiments, the lubrication controller 100 can be configured to allow a specified time for pump operation to be entered as the target time value 29. Operation of the lubrication controller 100 using these parameters may provide a quantity of lubrication to the pumping unit 20 that is related to the number of completed pumping cycles.

Figure 3:
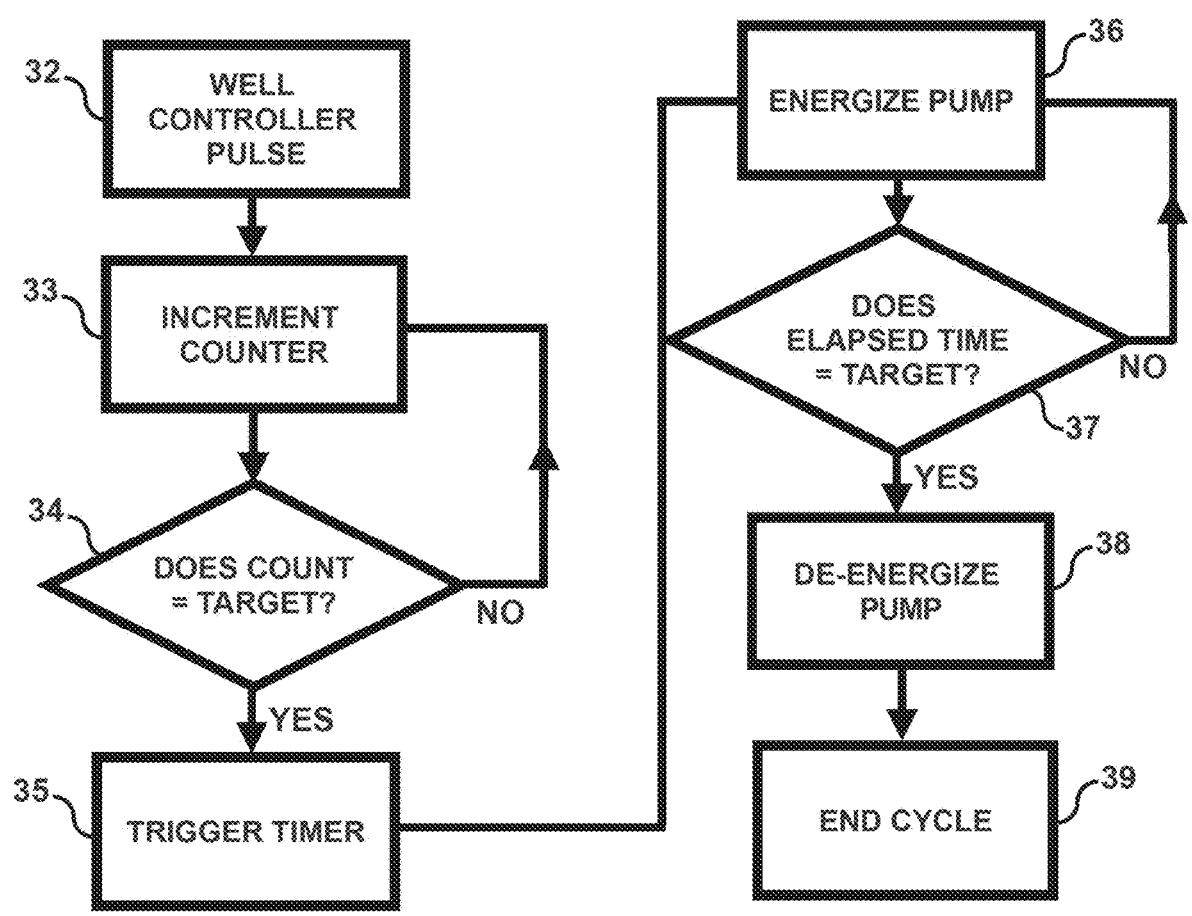
FIG. 3 illustrates the logical flow and operation of the ratiometric autonomous lubrication system.

FIG. 3. Provides an overview of a system operation in coordination with operation of the lubrication controller 100. Operation of the system may include steps 32,33,34, 35,36,37,38, and 39. A well controller pulse 32 may provide input to the system. When the pulse is received, step 33 may increment the counter. Step 34 determines when the accumulated count has reached the target count value 27. When target count value 27 has not been reached, step 33 continues to increment counter 26. When target count value 27 has been reached, step 35 may trigger the timer 28. Once the timer 28 has been triggered, step 36 may energize the lubrication pump 23. Step 37 compares the elapsed time with the target time 29. When the elapsed time is not equal to target time 29, the pump remains energized. When the elapsed time is equal to the target time 29, step 38 de-energizes the lubrication pump 23. Step 39 ends the cycle.

Figure 4:
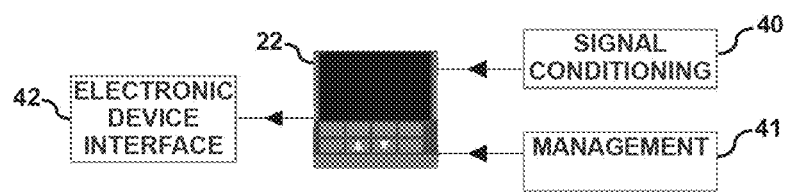
FIG. 4 is a block diagram illustrating input and output functions related to the event sequencer for the ratiometric autonomous lubrication.

FIG. 4 is a block diagram of the input and output functions related to a ratiometric system herein. For example, the lubrication controller 100 can include or communicate with a signal conditioning function 40 and a management system 41. In many embodiments, the signal conditioning function 40 and the management system 41 may be electrically coupled with the event sequencer 22. The signal conditioning function 40 may be configured to interface with and electrically condition a broad range of external events, making them suitable to be counted by the event sequencer 22. The external events may include, but are not limited to, electronic pulses of a plurality of frequencies and amplitudes and a contact closure from a plurality of electromechanical and solid-state contacts. Other types of external events are contemplated.

Figure 5:
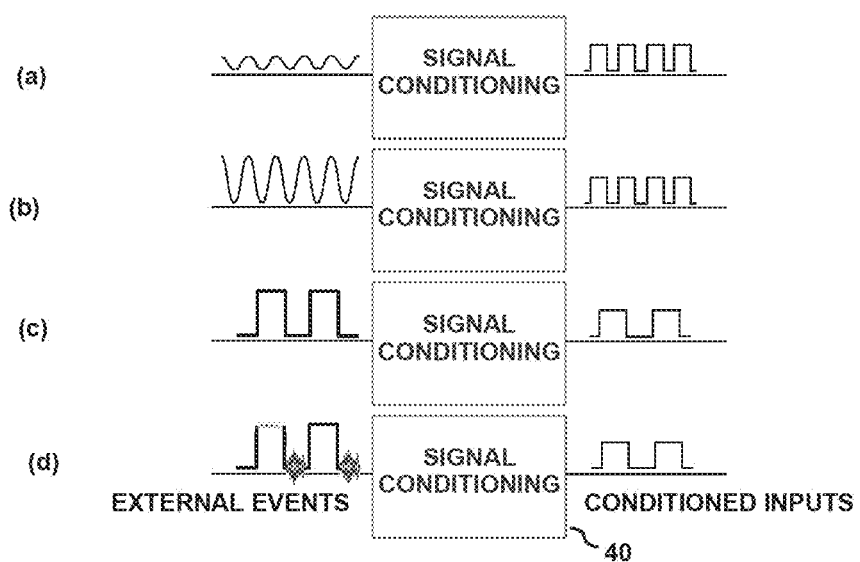
FIG. 5 illustrates different types of input signals and corresponding conditioned signals used for with the ratiometric autonomous lubrication system.

FIG. 5 illustrates different input signals and corresponding conditioned signals. In some embodiments, the signal conditioning 40 can include amplification, filtering, converting, range matching or other signal conditioning operations to accurately identify a pumping cycle and ignore signals from other components. For example, as shown in FIG. 5(*a*), the signal conditioning 40 can amplify and convert a sinusoidal input signal into a binary signal (e.g., represented by a square signal) having higher amplitude than the input, but same frequency. As shown in FIG. 5(*b*), the signal conditioning 40 can convert a sinusoidal input into a binary signal (e.g., represented by a square signal) with same amplitude as the input and same frequency. As shown in FIG. 5(*c*), the signal conditioning 40) can convert a binary input signal into another binary signal (e.g., represented by a square signal) having lower amplitude than the input, but same frequency.

As shown in FIG. 5(d), the signal conditioning 40 can filter any high frequency noise (e.g., from electrical components, sensors, etc.) from a noisy input signal to generate a clear square signal having different amplitude than the input, but same frequency.

Figure 6:
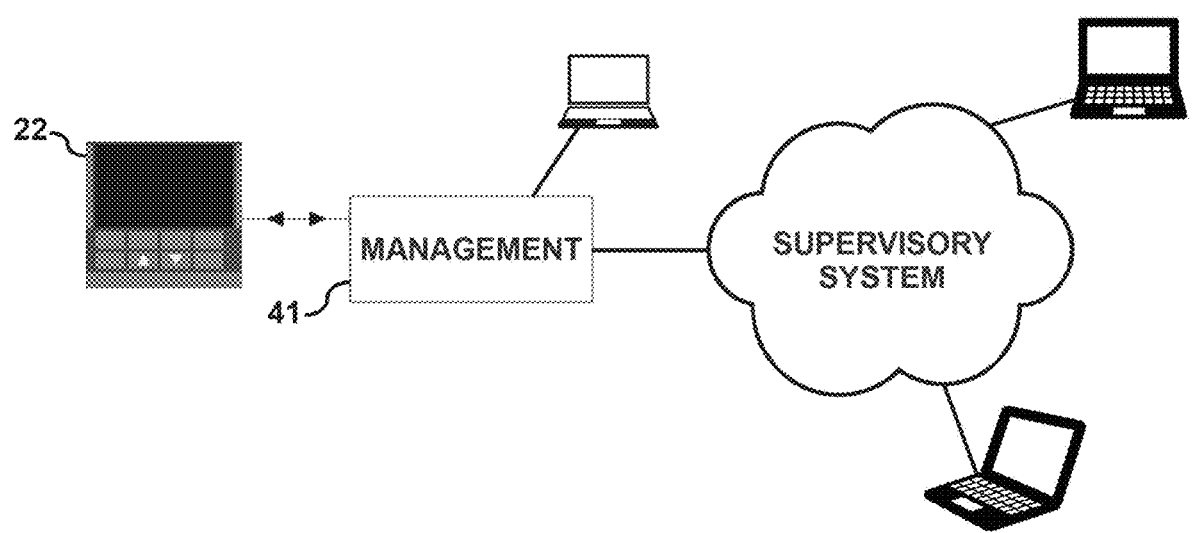
FIG. 6 illustrates an example of a management system for use with the ratiometric autonomous lubrication.

FIG. 6 is an example block diagram of the management system 41. The management system 41 may provide a mechanism for management of a system (e.g., oilwell, or other systems with pumping unit). The management system 41 can be configured to manage a system (e.g., the lubrication controller 100, an oilwell system, a pumping unit with a valve) locally or remotely. Capabilities may include observing real-time operation of the system along with the preset values for the system operation and/or the ratiometric system operation. The management system 41 may include the ability to change operating parameters of the system and/or the ratiometric system that relate to the system operation. The management system 41 may be connected to an electronic interface (e.g., 42 in FIG. 4) that supports an RS-485 physical connection as well as the Modbus data communication protocol. Other electronic interfaces and communication protocols are contemplated. The output of the event sequencer 22 may be electrically connected to the electronic device interface 42. The electronic device interface 42 provides an electronic interface that enables the ratiometric system to control a wide range of devices such as pumps, switches, and alarms. Other devices are contemplated.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Figure 7:
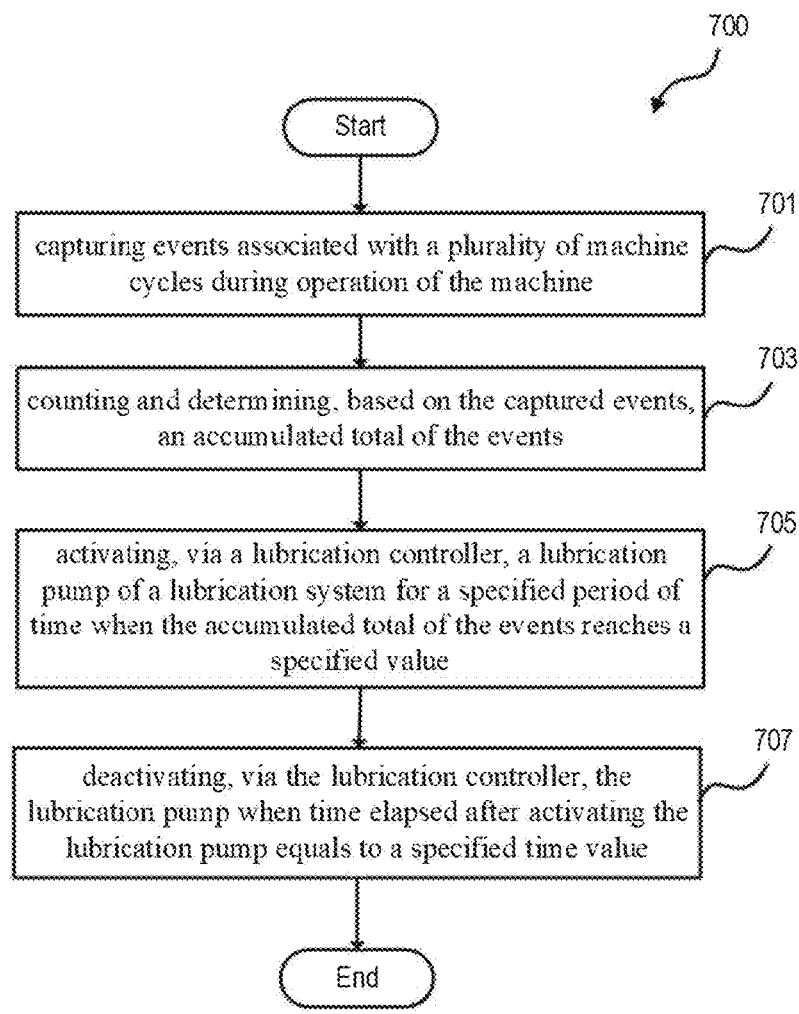
FIG. 7 is an example flow chart of a method for automatic lubrication of a machine, according to some embodiments.

FIG. 7 is a flow chart of a method for automatic lubrication of a machine involving multiple machine cycles. The method can include steps 701, 703, 705, and 707 can be implemented via a lubrication controller (e.g., 100). For example, the lubrication controller can be programmed to perform one or more steps of the method herein. The method can be applied to various applications e.g., oilwell, valve actuation, or other systems involving cyclical operations. When cyclical operations are involved lubrication timing, duration of the lubrication, an amount of lubrication, etc. can be important for proper functioning of the machine.

The method at step 701 can involve capturing, via a machine controller, events associated with a plurality of machine cycles during operation of the machine. Each of the events can be associated with a completion of a machine cycle. In some embodiments, the capturing of the events can include receiving an electrical signal associated with the machine cycle: conditioning the signal to generate a conditioned signal comprising information associated with completion of the plurality of machine cycles: and identifying, based on the conditioned signal, an event associated with each of the plurality of cycles. For example, conditioning of signals is illustrated in FIG. 5 involving amplification, noise filtering, other signal conditioning functions. In some embodiments, the receiving of the electrical signal can include detecting, via a sensor, a signal associated with completion of each of the machine cycle, generating, based on the detected signal, an electrical signal comprising information related to the completion of each of the machine cycle: and sending the electrical signal to the machine controller. In some embodiments, the signal can be detected by a Hall-effect sensor coupled to a cycling portion of the machine so that the completion of the machine cycle can be accurately detected. Other sensors such as proximity sensor, acceleration sensor, etc. may be appropriately positioned to detect and generate a signal associated with completion of the machine cycle.

The method at step 703 can involve counting and determining, based on the captured events, an accumulated total of the events. In some embodiments, the counting and determining of the accumulated total can include counting occurrence of the events based on the conditioned signal: and determining the accumulated total of the counted events. In some embodiments, the machine cycles can include strokes of a pumping system (e.g., as discussed with respect to FIG. 1A). In some embodiments, the events of the machine cycles can include a beginning of a stroke and an end of the stroke. The accumulated total of the events can include a total number of strokes. In some embodiments, the machine controller can include a well controller configured to receive signals from a sensor positioned to capture completion of each pumping action. In some embodiments, the machine cycles can include opening or closing events of a valve (e.g., as shown in FIG. 1C). The accumulated total of the events can include a total number of opening and closing events of the valve. The machine controller can be configured to control and track opening and closing events of the valve.

The method at step 705 can involve activating, via a lubrication controller, a lubrication pump of a lubrication system for a specified period of time when the accumulated total of the events reaches a specified value. For example, activating the lubrication pump can involve energizing or supplying power to the lubrication pump for the specified period of time. An example activating operation is discussed with respect to FIG. 3.

The method at step 707 can involve deactivating, via the lubrication controller, the lubrication pump when time elapsed after activating the lubrication pump is equal to a specified time value. An example deactivating operation is discussed with respect to FIG. 3.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A method of automatic lubrication of a stuffing box coupled to a pumping rod of an oilwell pumping unit, the method comprising:
    capturing, via an oilwell controller of the oilwell pumping unit, events associated with a plurality of pumping cycles of the oilwell pumping unit during operation of the stuffing box, wherein each of the events is associated with a completion of a pumping cycle of the oilwell pumping unit, wherein the pumping cycles of the oilwell pumping unit vary throughout a day;
    determining, based on the captured events, an accumulated total of the events of the oilwell pumping unit;
    responsive to the accumulated total of the events being within a specified range, activating, via a lubrication controller, a lubrication pump of a lubrication system for a specified time period as a function of a number of completed pumping cycles of the oilwell pumping unit, the lubricating pump being configured to deliver lubricant to the stuffing box; and
deactivating, via the lubrication controller, the lubrication pump when time elapsed after activating the lubrication pump equals to the specified time period.

2. The method of claim 1, wherein the capturing of the events comprises:
    receiving an electrical signal associated with the pumping cycle;
    conditioning the signal to generate a conditioned signal comprising information associated with completion of the plurality of pumping cycles; and
    identifying, based on the conditioned signal, an event associated with each of the plurality of pumping cycles.

3. The method of claim 2, wherein receiving the electrical signal comprises:
    detecting, via a sensor, a signal associated with completion of each of the pumping cycle;
    generating, based on the detected signal, an electrical signal comprising information related to the completion of each of the pumping cycle; and
    sending the electrical signal to the oilwell controller.

4. The method of claim 3, wherein detecting the signal comprises:
    detecting, via a Hall-effect sensor coupled to a cycling portion of the oilwell pumping unit, the signal associated with the completion of the pumping cycle.

5. The method of claim 2, wherein the determining of the accumulated total comprises:
    counting occurrence of the events based on the conditioned signal; and
    determining the accumulated total of the counted events.

6. The method of claim 1, wherein the pumping cycles comprise strokes of an oilwell pumping system.

7. The method of claim 6, wherein the events of the pumping cycles comprise a beginning of a stroke and an end of the stroke, and
    wherein the accumulated total of the events comprises a total number of strokes.

8. The method of claim 6, wherein the oilwell controller is a well controller configured to receive signals from a sensor positioned on a pumping unit of the pumping system to capture completion of each pumping action.

9. The method of claim 1, wherein the pumping cycles comprise opening or closing events of a valve.

10. The method of claim 9, wherein the accumulated total of the events comprises a total number of opening and closing events of the valve.

11. The method of claim 9, wherein the oilwell controller is configured to control and track opening and closing events of the valve.

12. The method of claim 1, wherein the accumulated total of the events correspond to a number of pumping cycles being between 50 and 150.

13. A lubrication controller for automatic lubrication of a stuffing box of an oilwell pumping unit, the controller comprising:
    one or more processors comprising an event sequencer, a counter, and a timer, the one or more processor being configured to:
    capture, via the event sequencer, events associated with a plurality of pumping cycles during operation of the stuffing box, wherein each of the events is associated with a completion of a pumping cycle of the oilwell pumping unit, wherein the pumping cycles of the oilwell pumping unit vary throughout a day;
    count, via the counter, the captured events associated with the completion of the plurality of pumping cycles,
    determine, via the counter, an accumulated total of the events associated with the plurality of pumping cycles;
    responsive to the accumulated total of the events being within a specified range, activate, via a lubrication controller, a lubrication pump of a lubrication system for a specified time period as a function of a number of completed pumping cycles of the oilwell pumping unit, the lubricating pump being configured to deliver lubricant to the stuffing box; and
    deactivate the lubrication pump when time elapsed measured by the timer after activating the lubrication pump equals to the specified time period.

14. The lubrication controller of claim 13, wherein the capturing of the events comprises:
    receiving an electrical signal associated with the pumping cycle;
    conditioning the signal to generate a conditioned signal comprising information associated with completion of the plurality of pumping cycles; and
    identifying, based on the conditioned signal, an event associated with each of the plurality of pumping cycles.

15. The lubrication controller of claim 14, wherein receiving the electrical signal comprises:
    detecting, via a sensor, a signal associated with completion of each of the pumping cycle;
    generating, based on the detected signal, an electrical signal comprising information related to the completion of each of the pumping cycle; and
    sending the electrical signal to the oilwell controller.

16. The lubrication controller of claim 15, wherein receiving the electrical signal comprises:
    detecting, via a Hall-effect sensor, the signal coupled to a cycling portion of the oilwell pumping unit, the signal associated with the completion of the pumping cycle.

17. The lubrication controller of claim 15, wherein the counting and determining of the accumulated total comprises:
    counting occurrence of the events based on the conditioned signal; and
    determining the accumulated total of the counted events.

18. The lubrication controller of claim 13, wherein the lubrication controller is configured to control lubrication of pumping unit of an oilwell or lubrication of a valve.

19. The lubrication controller of claim 13, wherein the accumulated total of the events correspond to a number of pumping cycles being between 50 and 150.

* * * * *